US010363921B2

(12) United States Patent
Shrestha et al.

(10) Patent No.: US 10,363,921 B2
(45) Date of Patent: Jul. 30, 2019

(54) CLUNK MITIGATION TECHNIQUES FOR PEDAL TIP-IN AND TIP-OUT EVENTS

(71) Applicants: Amit Shrestha, Rochester Hills, MI (US); Fadi Estefanous, Warren, MI (US); Lurun Zhong, Troy, MI (US); Yang Liang, Troy, MI (US)

(72) Inventors: Amit Shrestha, Rochester Hills, MI (US); Fadi Estefanous, Warren, MI (US); Lurun Zhong, Troy, MI (US); Yang Liang, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 286 days.

(21) Appl. No.: 15/486,435

(22) Filed: Apr. 13, 2017

(65) Prior Publication Data

US 2018/0297583 A1 Oct. 18, 2018

(51) Int. Cl.
| | |
|---|---|
| *B60W 20/17* | (2016.01) |
| *F02D 41/00* | (2006.01) |
| *F02D 13/02* | (2006.01) |
| *F16H 63/50* | (2006.01) |
| *B60W 10/06* | (2006.01) |
| *B60W 10/08* | (2006.01) |

(Continued)

(52) U.S. Cl.
CPC ............ *B60W 20/17* (2016.01); *B60W 10/06* (2013.01); *B60W 10/08* (2013.01); *F02D 41/0002* (2013.01); *F02D 41/107* (2013.01); *F16H 63/50* (2013.01); *B60W 2540/10* (2013.01); *B60W 2710/0633* (2013.01); *B60W 2710/0672* (2013.01); *B60W 2710/085* (2013.01); *B60Y 2200/92* (2013.01); *B60Y 2306/09* (2013.01); *F02D 11/02* (2013.01); *F02D 13/0226* (2013.01); *F02D 41/008* (2013.01); *F02D 2041/001* (2013.01); *Y10S 903/93* (2013.01)

(58) Field of Classification Search
CPC ...... B60W 20/17; B60W 10/06; B60W 10/08; B60W 2540/10; B60W 2710/0633; B60W 2710/0672; B60W 2710/085; B60Y 2200/92; B60Y 2306/09; F02D 41/002; F02D 41/107; F02D 11/02; F02D 13/0226; F02D 41/008; F02D 2041/001
See application file for complete search history.

(56) References Cited

U.S. PATENT DOCUMENTS 9,020,670 B2 * 4/2015 Abihana ............... B60W 10/06
180/65.28
9,458,932 B2 * 10/2016 Cho ........................ F16H 63/46
(Continued)

*Primary Examiner* — Hieu T Vo
(74) *Attorney, Agent, or Firm* — Ralph E. Smith

(57) ABSTRACT

A control system and method for a vehicle having a powertrain comprising a torque generating system and an automatic transmission each utilize a pedal position sensor configured to measure a position of an accelerator pedal of the vehicle and a controller configured to, based on the accelerator pedal position, detect a pedal tip-in or tip-out event and, in response to detecting the pedal tip-in or tip-out event: (i) determine a desired output torque for the torque generating system corresponding to the pedal tip-in or tip-out event and (ii) command the torque generating system to gradually transition, over a period, from its current output torque to the desired output torque to mitigate clunk caused by abrupt contact between gear teeth of the torque generating system shaft and the automatic transmission shaft.

20 Claims, 8 Drawing Sheets

(51) Int. Cl.
*F02D 41/10* (2006.01)
*F02D 11/02* (2006.01)

(56) References Cited

U.S. PATENT DOCUMENTS

2011/0276256 A1 11/2011 Kociba et al.
2015/0051808 A1 2/2015 Keller et al.

* cited by examiner

FIG. C

CLUNK MITIGATION TECHNIQUES FOR PEDAL TIP-IN AND TIP-OUT EVENTS

FIELD

The present application relates to vehicle control systems and, more particularly, to techniques for mitigating powertrain and/or driveline clunk caused by pedal tip-in and tip-out events.

BACKGROUND

A powertrain of a vehicle generates drive torque and transfers the drive torque to a drivetrain using a transmission. Examples of torque generating systems of the powertrain include an engine, an electric motor, and combinations thereof. For automatic transmissions, a vehicle control system (e.g., a controller) schedules and executes gear engagement operations between the torque generating system and the transmission. One primary goal of vehicle control systems is to perform gear engagement operations that are not noticeable to the driver. That is, any noise/vibration/harshness (NVH) or "clunk" caused by the gear engagement operations, such as a physical jerk of the vehicle or a loud sound, should be avoided or mitigated.

One scenario where clunk may occur is while in a higher gear (e.g., $5^{th}$ gear) of the automatic transmission and after accelerator pedal tip-in and tip-out events. After a pedal tip-out event, the powertrain torque request quickly decreases to zero and the actual torque output of the powertrain is zero or negative. This negative torque output means that the transmission is driving the powertrain, e.g., the engine's crankshaft or an electric motor. After a pedal tip-in event, the powertrain torque request quickly increases and the actual torque output of the powertrain increases to a positive value.

These pedal tip-in/tip-out transitions result in clunk. As shown in FIG. 1A, an engine/motor shaft 10 is typically driving a transmission shaft 12 in a first direction via respective gears 14, 16 each having a plurality of respective teeth 18, 20. After a pedal tip-out event, the transmission shaft 12 eventually begins driving the engine/motor shaft 10 in an opposite second direction as shown in FIG. 1B. This harsh or abrupt teeth-to-teeth contact causes clunk. Similarly, after a subsequent pedal tip-in event, the engine/motor shaft 10 begins driving the transmission shaft 12 in the first direction again (see FIG. 1A), which again causes the teeth 18, 20 to contact each other at contact point 22 as shown in FIG. 1C. This abrupt contact between the teeth 18, 20 causes clunk 24 (see FIG. 1C), which could comprise physical vibration and/or audible noise.

Conventional vehicle control systems command an instantaneous torque request in response to a pedal tip-in or tip-out event. By decreasing the rate of change of the torque request, clunk could be mitigated or eliminated. Conventional vehicle control systems, however, utilize spark retardation to temporarily reduce engine torque and generate a torque reserve. Spark retardation, however, increases exhaust gas temperature, when has potential negative effects the life of the vehicle's catalytic converter, brake-specific carbon monoxide (BSCO) or similar emissions (e.g., hydrocarbon (HC) slip), and/or fuel economy. Accordingly, while such vehicle control systems work for their intended purpose, there remains a need for improvement in the relevant art.

SUMMARY

According to one example aspect of the invention, a control system for a vehicle having a powertrain comprising a torque generating system and an automatic transmission is presented. In one exemplary implementation, the system comprises a pedal position sensor configured to measure a position of an accelerator pedal of the vehicle and a controller configured to: based on the accelerator pedal position, detect a pedal tip-in or tip-out event, where the pedal tip-in event comprises a transition from (a) a shaft of the automatic transmission driving a shaft of the torque generating system to (b) the torque generating system shaft driving the automatic transmission shaft, and where the pedal tip-out event comprises an opposite transition than the pedal tip-in event; and in response to detecting the pedal tip-in or tip-out event: (i) determine a desired output torque for the torque generating system corresponding to the pedal tip-in or tip-out event and (ii) command the torque generating system to gradually transition, over a period, from its current output torque to the desired output torque to mitigate clunk caused by abrupt contact between gear teeth of the torque generating system shaft and the automatic transmission shaft.

In some implementations, the torque generating system comprises an engine having a variable valve control (VVC) system configured to control at least one of a lift of and an actuation of an intake valve of the engine, and the controller is configured to command the VVC system to gradually transition the engine from its current output torque to the desired output torque. In some implementations, the controller is configured to command the VVC system to: initially set the lift of the intake valve at a first lift that is different than a desired second lift corresponding to the desired output torque, and by the end of the period, set the lift of the intake valve at the desired second lift. In some implementations, for the tip-in event, the first lift is less than the desired second lift and, for the tip-out event, the first lift is greater than the desired second lift.

In some implementations, the torque generating system comprises an engine having a plurality of cylinders and a plurality of respective fuel injectors, and the controller is configured to command the engine by performing individual cylinder open-loop fuel control. In some implementations, the controller is configured to perform individual cylinder open-loop fuel control by commanding each fuel injector to inject an amount of fuel according to a predetermined fuel supply curve over the period. In some implementations, each predetermined fuel supply curve is optimized based on test data to prevent lean/rich spikes for its respective cylinder that further exacerbate clunk. In some implementations, injection of the amount of fuel according to the predetermined fuel supply curves decreases exhaust gas temperature to mitigate or eliminate damage to a catalytic converter.

In some implementations, the torque generating system comprises an electric motor, and the controller is configured to control the electric motor to gradually transition, over the period, from its current output torque to the desired output torque by controlling a power supplied to the electric motor. In some implementations, the controller is further configured to detect that the automatic transmission is in one of its higher gears as a pre-condition to commanding the torque generating system to gradually transition, over the period, from its current output torque to the desired output torque.

According to another example aspect of the invention, a method for controlling a powertrain of a vehicle is presented. In one exemplary implementation, the method comprises obtaining, by a controller, a position of an accelerator pedal of the vehicle; based on the accelerator pedal position, detecting, by the controller, a pedal tip-in or tip-out event, where the pedal tip-in event comprises a transition from (a) a shaft of an automatic transmission of the powertrain driving a shaft of the torque generating system of the powertrain to (b) the torque generating system shaft driving the automatic transmission shaft, and where the pedal tip-out event comprises an opposite transition than the pedal tip-in event; and in response to detecting the pedal tip-in or tip-out event: (i) determining, by the controller, a desired output torque for the torque generating system corresponding to the pedal tip-in or tip-out event and (ii) commanding, by the controller, the torque generating system to gradually transition, over a period, from its current output torque to the desired output torque to mitigate clunk caused by abrupt contact between gear teeth of the torque generating system shaft and the automatic transmission shaft.

In some implementations, the torque generating system comprises an engine having a VVC system configured to control at least one of a lift of and an actuation of an intake valve of the engine, and commanding the torque generating system comprises commanding the VVC system to gradually transition the engine from its current output torque to the desired output torque. In some implementations, commanding the VVC system comprises: initially setting the lift of the intake valve at a first lift that is different than a desired second lift corresponding to the desired output torque, and by the end of the period, setting the lift of the intake valve at the desired second lift. In some implementations, for the tip-in event, the first lift is less than the desired second lift and, for the tip-out event, the first lift is greater than the desired second lift.

In some implementations, the torque generating system comprises an engine having a plurality of cylinders and a plurality of respective fuel injectors, and commanding the engine comprises performing individual cylinder open-loop fuel control. In some implementations, performing individual cylinder open-loop fuel control by commanding, by the controller, each fuel injector to inject an amount of fuel according to a predetermined fuel supply curve over the period. In some implementations, each predetermined fuel supply curve is optimized based on test data to prevent lean/rich spikes for its respective cylinder that further exacerbate clunk. In some implementations, injection of the amount of fuel according to the predetermined fuel supply curves decreases exhaust gas temperature compared to closed-loop fuel control to mitigate or eliminate damage to a catalytic converter.

In some implementations, the torque generating system comprises an electric motor, and controlling the electric motor comprises controlling a power supplied to the electric motor. In some implementations, the method further comprises detecting, by the controller, that the automatic transmission is in one of its higher gears as a pre-condition to commanding the torque generating system to gradually transition, over the period, from its current output torque to the desired output torque.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIGS. 6A-6D are plots of half shaft torque disturbances and gradual torque transitions for three different transition periods according to some aspects of the present disclosure;

DETAILED DESCRIPTION

As previously discussed, conventional vehicle control systems suffer from clunk after pedal tip-in and tip-out events caused by abrupt contact between gear teeth. Some engines include variable valve control (VVC) systems that control a lift, timing, and/or actuation of intake valves of the engine, which in turn control the flow of fresh air into the cylinders. In some implementations, variable valve lift (VVL) systems control lift of the intake valves, whereas variable valve actuation (VVA) systems control actuation of the intake valves by a camshaft. Another type of VVC system is variable valve timing (VVT), which controls intake valve open/close timing. A VVL system, for example, may operate the intake valves according to two different cam profiles: a low-lift mode for low engine loads and a high-lift mode for high engine loads.

The techniques of the present disclosure utilize an engine's existing VVC system or individual cylinder open-loop fuel control to gradually transition to a desired output torque of the engine after a tip-in or tip-out event, thereby eliminating or mitigating clunk caused by abrupt contact between gear teeth of the engine and an automatic transmission. For the VVC-based techniques, a lower valve lift profile or a different camshaft profile is initially commanded to cause the engine to output less than the desired torque output. After teeth-to-teeth engagement occurs, a different or optimized lift profile is commanded to reach the desired engine torque output. For the fuel control techniques, predetermined fuel supply curves specific to each cylinder are utilized for controlling respective fuel injectors, thereby avoiding rich/lean spikes that also cause disturbances at the crankshaft, which further exacerbate the clunk problem.

In some implementations, the gradual change in powertrain torque output to mitigate or eliminate clunk could be achieved by controlling a hybrid powertrain. More specifically, a hybrid vehicle (a plug-in hybrid electric vehicle, or PHEV) typically includes one or more electric motors and an optional engine. In these types of vehicles, one or more of the electric motors could be controlled to gradually transition, during the period, from its current output torque to the desired output torque. This could include, for example, controlling the power (e.g., current) supplied to the one or more electric motors, which in turn would affect the powertrain torque output. At least a portion of the desired torque output of the powertrain could also be provided via the optional engine, e.g., a second stage of a torque increase after a pedal tip-in event.

Figure 2:
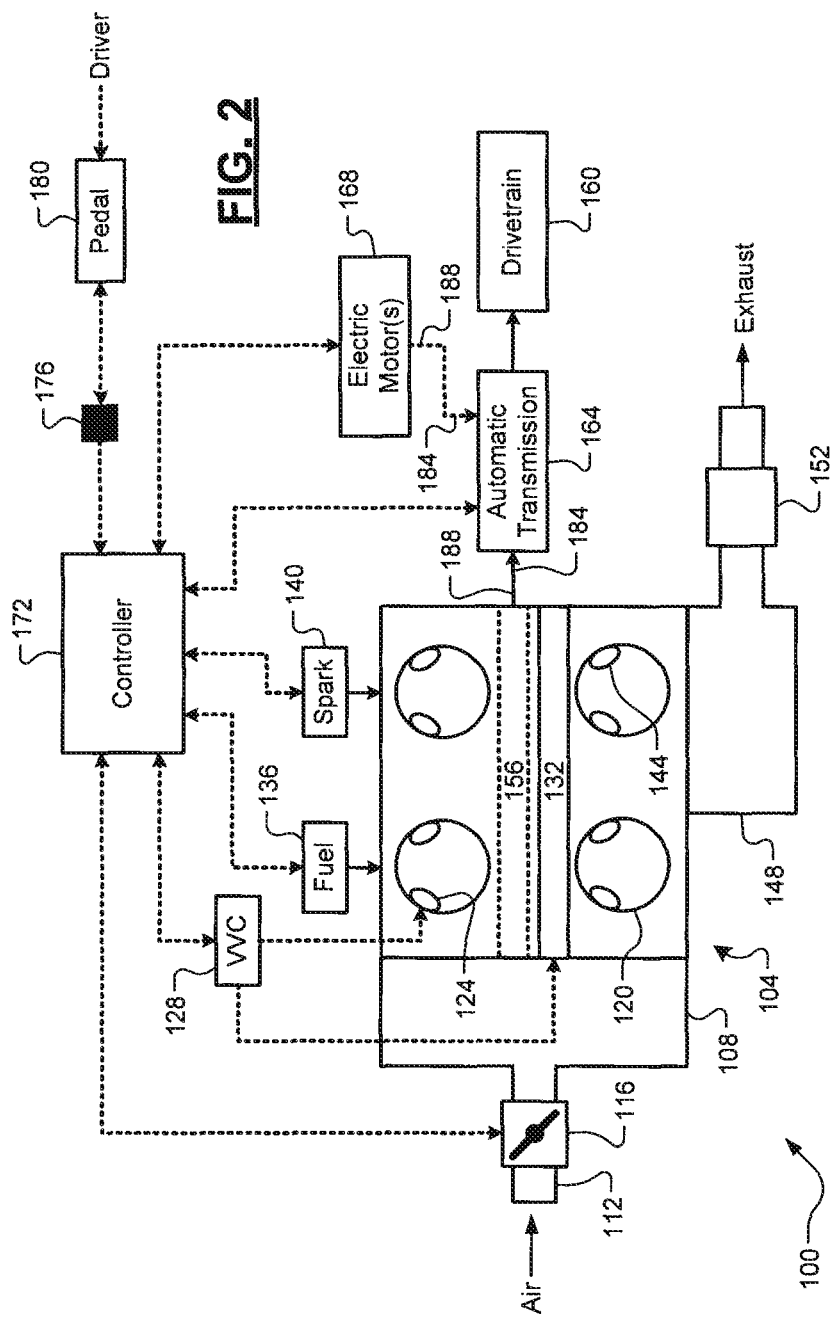
FIG. 2 is a diagram of an example vehicle having a powertrain comprising an automatic transmission according to some aspects of the present disclosure.

Referring now to FIG. 2, a diagram of an example vehicle 100 is illustrated. The vehicle 100 includes an engine 104 that is configured to combust a mixture of air and fuel (e.g., gasoline) to generate drive torque. The engine 104 could be any suitable type of spark-ignition engine. In operation, the engine 104 draws air into an intake manifold 108 through an induction system 112 that is selectively regulated by a throttle valve 116. The air in the intake manifold 108 is distributed to a plurality of cylinders 120 via respective intake valves 124. While four cylinders are shown, it will be appreciated that the engine 104 could include any suitable number of cylinders. The lift and/or actuation of the intake valves 124 are controlled by a VVC system 128. In some exemplary implementations, the VVC system 128 utilizes a hydraulic actuator to adjust a lift of the intake valves (e.g., VVL) or a solenoid to switch between two or more different profiles of a camshaft 132 (e.g., WA). While a single camshaft 132 is shown, it will be appreciated that the engine 104 could include a plurality of different camshafts.

The air provided to the cylinders 120 is also combined with fuel from fuel injectors 136 to create an air/fuel mixture. The fuel injectors 136 are configurable in any suitable injection configuration (port fuel injection, direct fuel injection, etc.). The air/fuel mixture within the cylinders 120 is compressed by pistons (not shown) and the compressed air/fuel mixture is combusted by spark provided by spark plugs 140. Exhaust gas resulting from combustion is expelled from the cylinders 120 via respective exhaust valves 144 and into an exhaust treatment system 148. The exhaust treatment system 148 treats the exhaust gas to eliminate or reduce emissions before releasing it into the atmosphere. One example component of the exhaust treatment system 148 is a catalytic converter 152, such as a three-way catalytic converter (TWC) that is configured to convert CO, nitrogen oxide (NOx), and hydrocarbon (HC) to nitrogen, oxygen, carbon dioxide ($CO_2$), and water ($H_2O$)).

The combustion of the compressed air/fuel mixture drives the pistons (not shown), which rotatably turn a crankshaft 156 and generate drive torque. The drive torque is transferred from the crankshaft 156 to a drivetrain 160 (e.g., wheels) of the vehicle 100 via an automatic transmission 164. The automatic transmission 164 is configured to operate in a plurality of different gear ratios for varying the translation of the drive torque from the crankshaft 156 to the drivetrain 160. In some implementations, the vehicle 100 is a hybrid vehicle that includes one or more electric motors 168 that are configured to output drive torque, e.g., to the automatic transmission 164 to propel the vehicle 100 or to the crankshaft 156 to start the engine 104. Thus, for such hybrid vehicles, the engine 104 is optional. The engine 104, the electric motor(s) 168, and combinations thereof are collectively referred to as a torque generating system of a powertrain of the vehicle 100 (and the powertrain can further include the automatic transmission 164). The operation of the vehicle 100, including the control of the VVC system 128, the automatic transmission 164, and the optional electric motor(s) 168, is controlled by a controller 172. It will be appreciated that the controller 172 also controls other suitable components of the vehicle, such as the throttle valve 116, the fuel injectors 136, the spark plugs 140, and the exhaust valves 144. The controller 172 also receives a set of measured parameters from a set of sensors 176, respectively. One example of the sensor(s) 176 is an accelerator pedal position sensor that measures a position of an accelerator pedal 180.

Figure 1A:
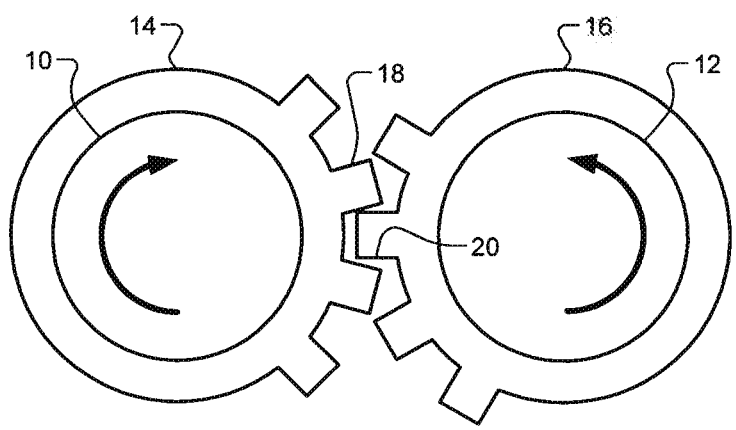
FIGS. 1A-1C are diagrams of example interactions between engine/motor and transmission shafts and their respective gears/teeth according to the prior art.
Figure 1B:
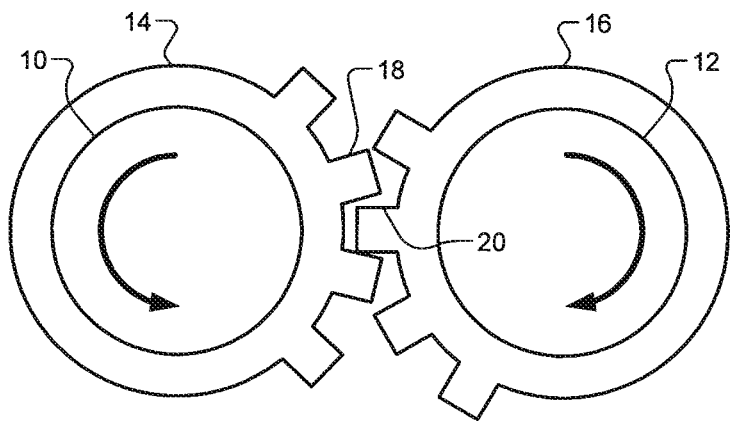
Figure 1C:
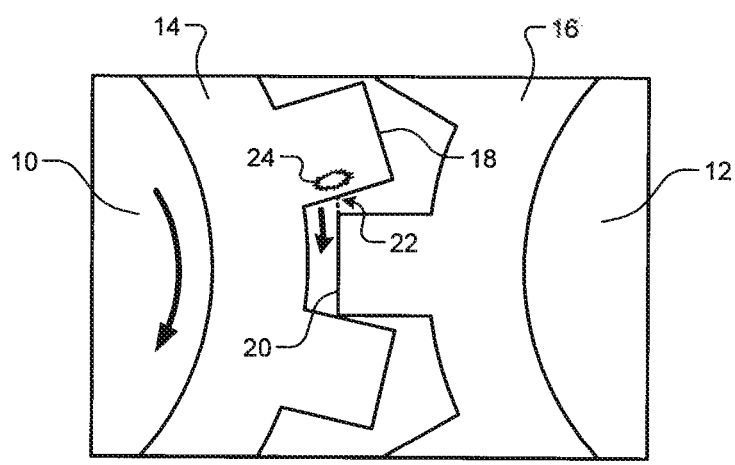
Figure 3:
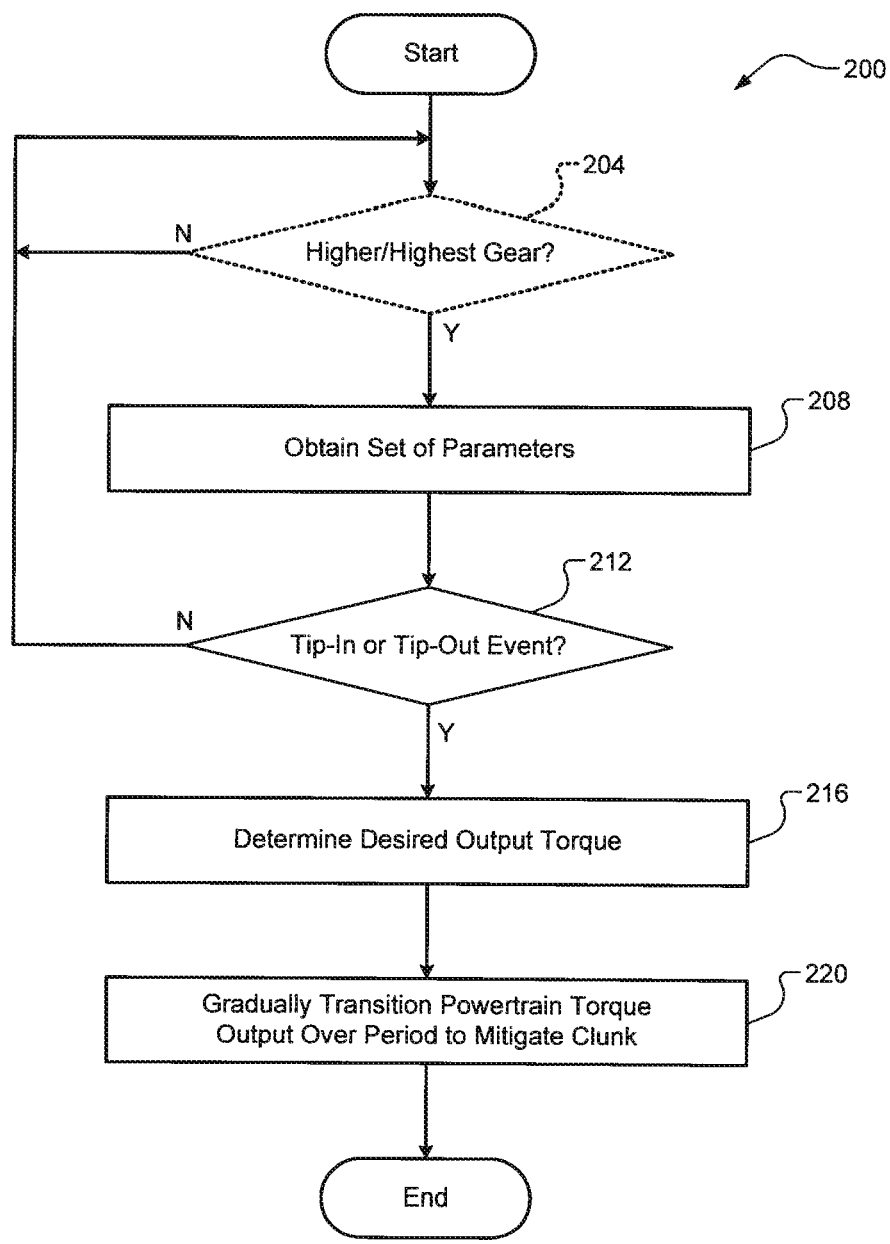
FIG. 3 is a flow diagram of an example clunk mitigation method for pedal tip-in and tip-out events according to some aspects of the present disclosure.

Referring now to FIG. 3, an example flow diagram of a method 200 for mitigating clunk for pedal tip-in and tip-out events is illustrated. At optional 204, the controller 172 determines whether the automatic transmission 164 is operating in one of its higher gears or one of its lower gear ratios. For example, this method 200 could only be performed when the automatic transmission 164 is operating in its highest gear (e.g., $5^{th}$ gear). Alternatively, for example, the method 200 could be performed when the automatic transmission is operating in one of its higher gears, i.e., not $1^{st}$ gear (e.g., $2^{nd}$ gear through $5^{th}$ gear, $3^{rd}$ gear through $5^{th}$ gear, etc.). Clunk caused by pedal tip-in and tip-out events is typically more prevalent when the automatic transmission 164 is in its highest gear, e.g., during highway driving. If true, the method 200 proceeds to 208. Otherwise, the method 200 ends or returns to 204. At 208, the controller 172 obtains a set of parameters, such as accelerator pedal position. Based on these parameters, the controller 172 determines whether a pedal tip-in or tip-out event is occurring or has occurred. As previously discussed herein and illustrated in FIGS. 1A-1C, the pedal tip-in event comprises a transition from (a) a shaft 184 of the automatic transmission driving 188 a shaft of the torque generating system to (b) the torque generating system shaft 188 driving the automatic transmission shaft 184, and wherein the pedal tip-out event comprises an opposite transition than the pedal tip-in event (see, e.g., FIG. 2). When the pedal tip-in or tip-out event is detected, the method 200 proceeds to 216. Otherwise, the method 200 ends or returns to 204.

At 216, the controller 172 determines a desired torque output of the torque generating system. For example, this desired torque output could be determined based on the accelerator pedal position. Other parameters, such as those measured by sensor(s) 176, could also be utilized, such as engine load, engine speed, and vehicle speed. At 220, the controller 172 commands the torque generating system to gradually transition, over a period, from its current output torque to the desired output torque to mitigate clunk caused by harsh or abrupt contact between gear teeth of the torque generating system shaft 188 and the automatic transmission shaft 184. The method 200 then ends or returns to 204 for one or more additional cycles. Specific implementations for step 220 are illustrated in FIGS. 3A-3C and discussed in greater detail below.

Figure 4A:
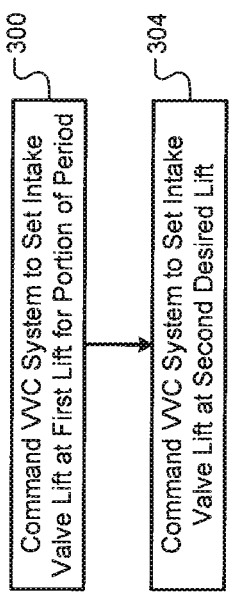
FIGS. 4A-4C are flow diagrams of example methods of gradually increasing/decreasing powertrain output torque for pedal tip-in or tip-out events in the example method of FIG. 3.
Figure 4B:
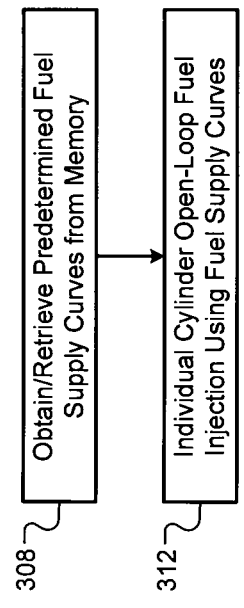
Figure 5A:
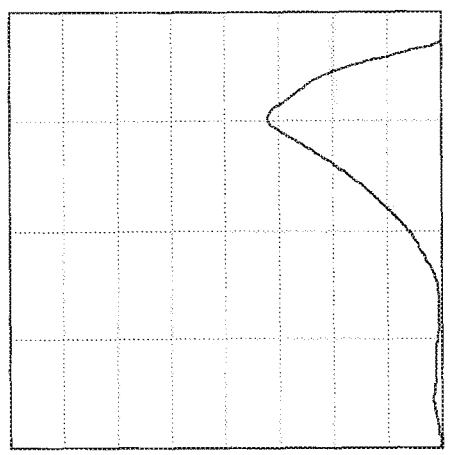
FIGS. 5A-5D are plots of example transitional valve lift profiles for pedal tip-in and tip-out events according to some aspects of the present disclosure.
Figure 5B:
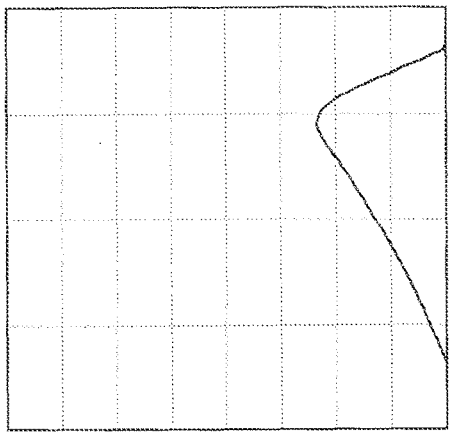
Figure 5C:
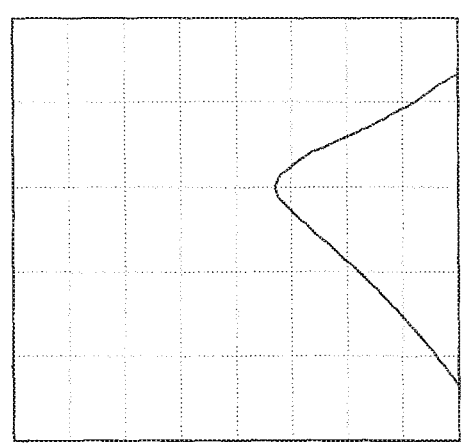
Figure 5D:
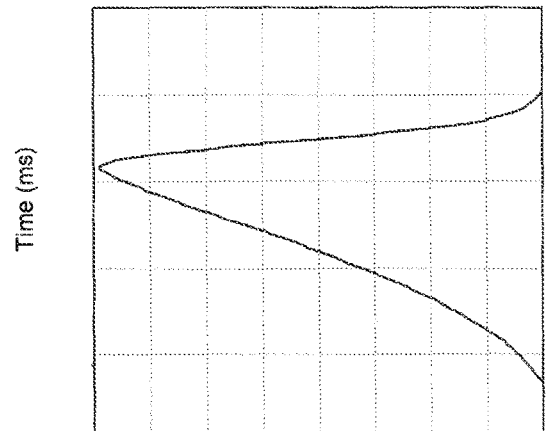

Referring to FIGS. 4A and 5A-5B, in one implementation 220A, the VVC system 128 has previously set the lift of the intake valve according to a normal valve lift profile (FIG. 5A). In 220A, the controller 172 commands the VVC system 128 at 300 to initially set the lift of the intake valve 124 at a first lift that is different than a desired second lift corresponding to the desired output torque and by the end of the period at 304, set the lift of the intake valve 124 at the desired second lift. For the tip-in event, a first valve lift profile (FIG. 5C) is initially utilized followed by a desired second valve lift profile (FIG. 5D). In some implementations, a portion of the period that the intake valve 124 is set at the first lift corresponds to an increase in output torque of the engine 104 to approximately zero. Similarly, for the tip-out event, a valve lift profile (FIG. 5B) is greater than the desired second lift (e.g., zero with fuel cutoff). In some implementations, a portion of the period that the intake valve 124 is set at the first lift corresponds to a decrease in output torque of the engine 104 to approximately zero.

Figure 6A:
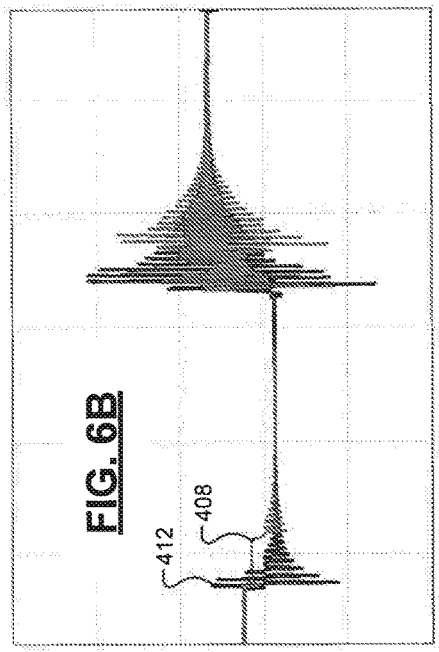
Figure 6B:
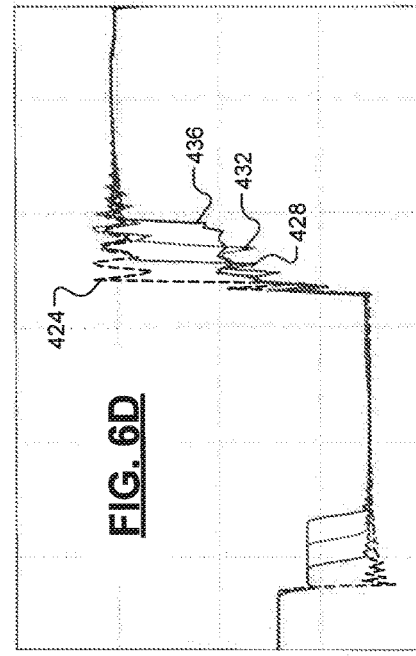
Figure 6D:
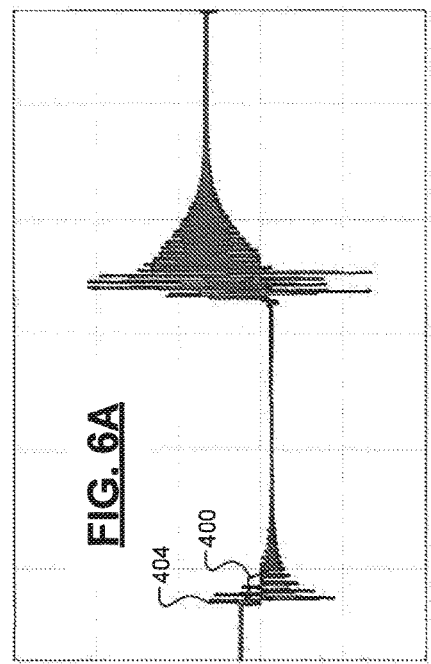
Figure 6D:
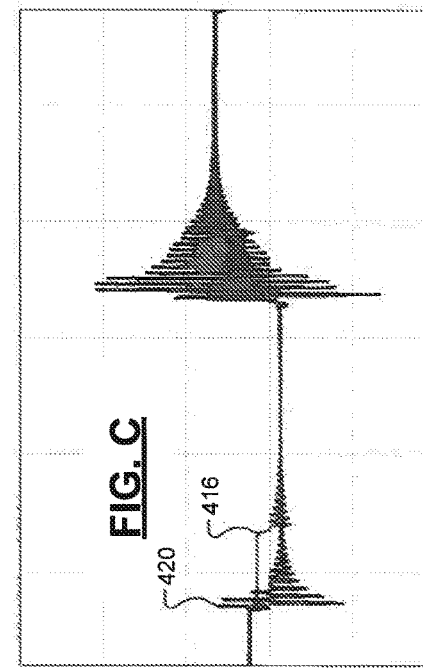

FIGS. 6A-6D further illustrate half shaft and engine torques for three different scenarios: (1) holding the transition valve lift profiles for a short first period, e.g., 0.5 seconds (FIG. 6A), (2) holding the transition valve lift profiles for a moderate second period, e.g., 1.0 seconds (FIG. 6B), and (3) holding the transition valve lift profiles for a long third period, e.g., 1.5 seconds (FIG. 6C). As shown, each of these scenarios results in substantially less half shaft torque disturbance (see curves 400, 408, 416) compared to a baseline (i.e., no transition valve lift profiles; see curves 404, 412, 420). As shown in FIG. 6D, utilizing these transition valve lift profiles causes a step-down (after tip-out) or a step-up (after tip-in) of engine torque to achieve the gradual transition. In FIG. 6D, curves 424, 428, 432, and 436 correspond to the baseline and the three scenarios FIG. 6A, FIG. 6B, and FIG. 6C, respectively.

Figure 7A:
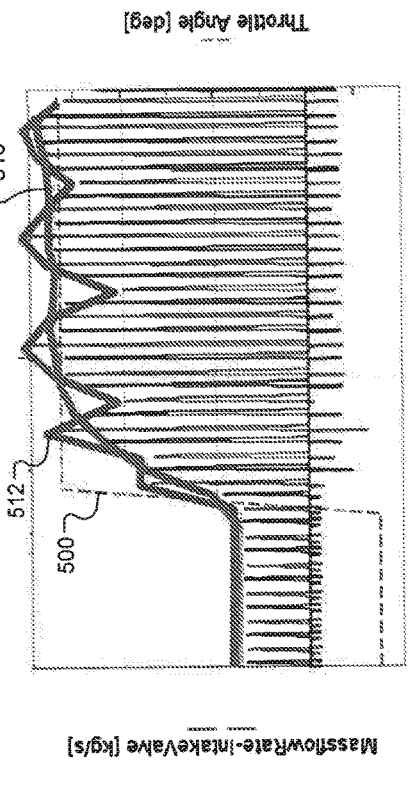
FIGS. 7A-7D are plots of intake valve opening (Phi1) and closing (Phi2), intake valve mass flow rate, cylinder pressure, and air/fuel (lambda) ratios for a pedal-tip in event for both a conventional fuel control technique and the individual cylinder open-loop fuel control technique according to some aspects of the present disclosure.

Referring now to FIGS. 4B and 7A-7D, in another implementation 220B, the controller 172 obtains/retrieves (e.g., from its memory) predetermined fuel supply curves specific to each cylinder 120 at 308. At 312, the controller 172 then utilizes these fuel supply curves to control the fuel injectors 136 to perform individual cylinder open-loop fuel control at 312. By doing so, the controller 172 is able to accurately control cylinder fueling to gradually increase/decrease engine output torque after a tip-in/tip-out event. FIGS. 7A-7D further illustrate the differences between conventional fuel control and the disclosed techniques. In FIG. 7A, a throttle angle curve 500 represents a tip-in event (from X1 degrees to X2 (X2>X1) degrees open). Curves Phi1 (504) and Phi2 (508) corresponding to these values of X1 and X2, respectively. Conventional fueling control techniques for tip-in/tip-out events, for example, involve an immediate or instantaneous command of the air/fuel ratio to a desired value.

Figure 7B:
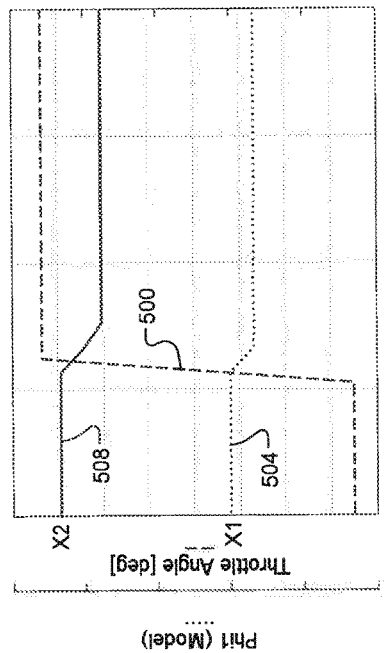
Figure 7C:
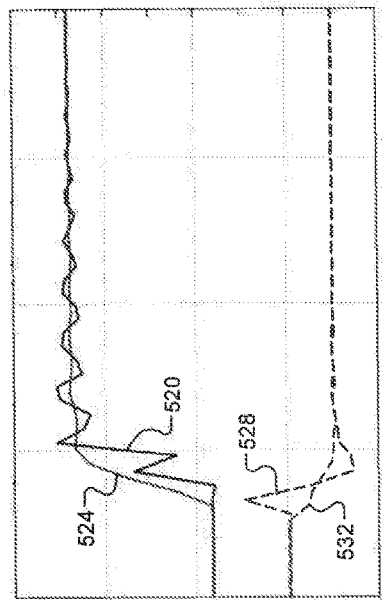
Figure 7D:
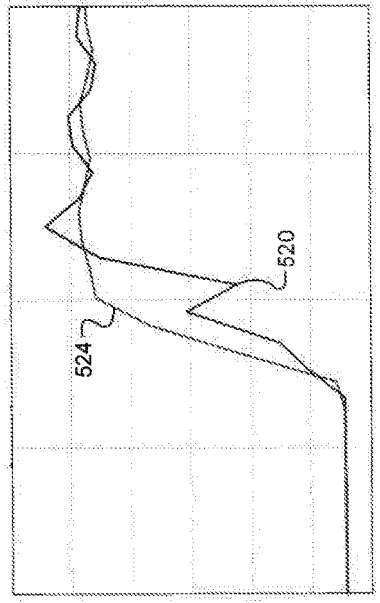

FIG. 7B illustrates the effects of such conventional fuel control on intake valve mass flow rate (see curve 512). Specifically, the intake valve mass flow rate is unstable and includes a plurality of spikes. FIG. 7C similarly illustrates a cylinder pressure curve 520 according to conventional fuel control techniques. Again, the curve 520 is unstable and includes a plurality of peaks. By utilizing the predetermined fuel supply curves disclosed herein, smoother curves 516 and 524 are achieved (see FIGS. 7B-7C). Lastly, FIG. 7D illustrates curves 520, 524 along with stoichiometric air/fuel ratio (lambda) values. As shown, conventional fuel control techniques result in a plurality of lean/rich spikes (see curve 528). In some cases, lean/rich flows from different cylinders meet in exhaust manifold to undergo post-oxidation reactions, thereby increasing the exhaust gas temperature (e.g., greater than 1100 degrees Celsius), which could damage the catalytic converter 152 over time. In contrast, the predetermined fuel supply curves result in a gradual lambda decrease for the tip-in event from lean (e.g., $\lambda \sim =2$) to approximately stoichiometric (e.g., $\lambda \sim =1$).

Figure 8A:
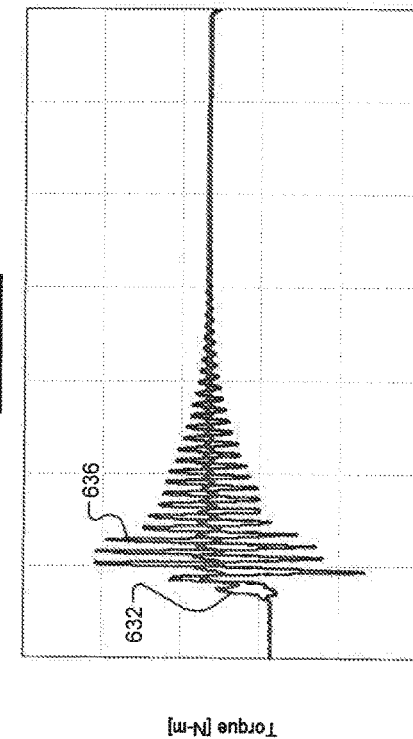
FIGS. 8A-8D are plots of fuel supply curves (air/fuel ratios), half shaft torque disturbances, engine speed fluctuations, and engine torque fluctuations for both the conventional fuel control technique and the individual cylinder open loop fuel control technique according to some aspects of the present disclosure.
Figure 8B:
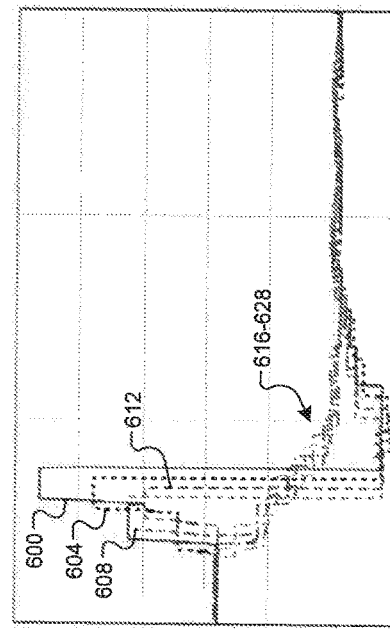
Figure 8D:
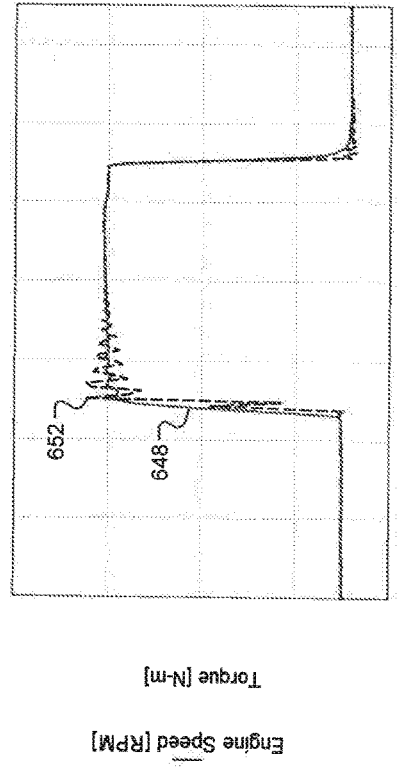
Figure 8C:
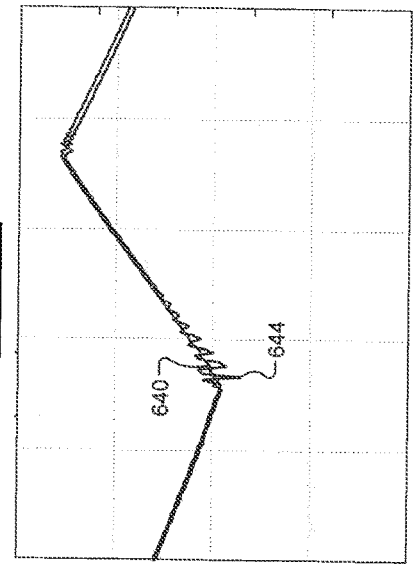

FIGS. 8A-8D further illustrate the benefits of the disclosed open-loop individual cylinder fuel control techniques. In FIG. 8A, conventional air/fuel ratio (lambda) curves 600, 604, 608, and 612 are shown for four different cylinders 120 of the engine 104. For example, the engine 104 could be a four cylinder engine. As shown, these baseline curves step the air/fuel ratio lean (e.g., $\lambda > 1$) and then step the air/fuel ratio rich (e.g., $\lambda < 1$). In contrast, the predetermined fuel supply curves 616, 620, 624, 628 (616-628) for the same four cylinders gradually transition from lean to approximately stoichiometric. One benefit illustrated by FIG. 8B is substantially less of a half shaft torque disturbance for the disclosed techniques (curve 632) compared to the conventional techniques (curve 636). Another way to view this benefit is substantially less of an engine speed fluctuation for the disclosed technique (curve 640, FIG. 8C) compared to the conventional techniques (curve 644, FIG. 8C) and substantially less of an engine torque fluctuation for the disclosed technique (curve 648, FIG. 8D) compared to the conventional techniques (curve 652, FIG. 8D). These lean/rich spikes and the corresponding disturbances/fluctuations collectively cause the clunk.

Figure 4C:
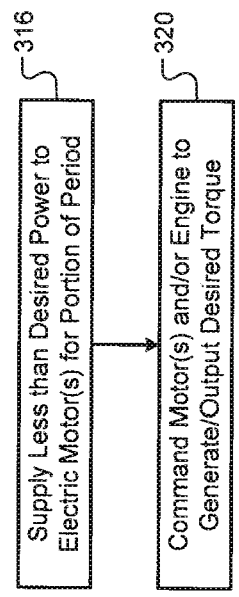

Referring now to FIG. 4C, in another implementation 220C, the controller 172 supplies less than a desired power (e.g., current) to the electric motor(s) 168 for a portion of the period as an alternative method for gradually transitioning to the desired powertrain torque output at 316. This desired power corresponds to the desired powertrain torque output. For vehicles having both the electric motor(s) 168 and the engine 104, the engine 104 could also provide at least a portion of the powertrain output torque. For example only, the electric motor(s) 168 could be initially utilized to generate drive torque to engage the powertrain shaft teeth with the automatic transmission shaft teeth such that the engine/motor begins driving the automatic transmission 164. After this initial engagement, the engine 104 could then be commanded to ramp up the powertrain output torque to the desired level at 320. Alternatively, the electric motor(s) 168 could then be commanded to generate the remainder of the desired torque at 320. For example only, for a multiple-motor configuration, one of the electric motors 168 could be initially commanded, and then two or more of the electric motors 168 could then be commanded.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for a vehicle having a powertrain comprising a torque generating system and an automatic transmission, the control system comprising:
   a pedal position sensor configured to measure a position of an accelerator pedal of the vehicle; and
   a controller configured to:

based on the accelerator pedal position, detect a pedal tip-in or tip-out event, wherein the pedal tip-in event comprises a transition from (a) a shaft of the automatic transmission driving a shaft of the torque generating system to (b) the torque generating system shaft driving the automatic transmission shaft, and wherein the pedal tip-out event comprises an opposite transition than the pedal tip-in event; and in response to detecting the pedal tip-in or tip-out event:
(i) determine a desired output torque for the torque generating system corresponding to the pedal tip-in or tip-out event, and
(ii) command the torque generating system to gradually transition, over a period, from its current output torque to the desired output torque to mitigate clunk caused by abrupt contact between gear teeth of the torque generating system shaft and the automatic transmission shaft.

2. The control system of claim 1, wherein the torque generating system comprises an engine having a variable valve control (VVC) system configured to control at least one of a lift of and an actuation of an intake valve of the engine, and wherein the controller is configured to command the VVC system to gradually transition the engine from its current output torque to the desired output torque.

3. The control system of claim 2, wherein the controller is configured to command the VVC system to:
initially set the lift of the intake valve at a first lift that is different than a desired second lift corresponding to the desired output torque; and
by the end of the period, set the lift of the intake valve at the desired second lift.

4. The control system of claim 3, wherein:
for the tip-in event, the first lift is less than the desired second lift; and
for the tip-out event, the first lift is greater than the desired second lift.

5. The control system of claim 1, wherein the torque generating system comprises an engine having a plurality of cylinders and a plurality of respective fuel injectors, and wherein the controller is configured to command the engine by performing individual cylinder open-loop fuel control.

6. The control system of claim 5, wherein the controller is configured to perform individual cylinder open-loop fuel control by commanding each fuel injector to inject an amount of fuel according to a predetermined fuel supply curve over the period.

7. The control system of claim 6, wherein each predetermined fuel supply curve is optimized based on test data to prevent lean/rich spikes for its respective cylinder that further exacerbate clunk.

8. The control system of claim 7, wherein injection of the amount of fuel according to the predetermined fuel supply curves decreases exhaust gas temperature to mitigate or eliminate damage to a catalytic converter.

9. The control system of claim 1, wherein the torque generating system comprises an electric motor, and wherein the controller is configured to control the electric motor to gradually transition, over the period, from its current output torque to the desired output torque by controlling a power supplied to the electric motor.

10. The control system of claim 1, wherein the controller is further configured to detect that the automatic transmission is in one of its higher gears as a precondition to commanding the torque generating system to gradually transition, over the period, from its current output torque to the desired output torque.

11. A method for controlling a powertrain of a vehicle, the powertrain comprising a torque generating system and an automatic transmission, the method comprising:
obtaining, by a controller, a position of an accelerator pedal of the vehicle;
based on the accelerator pedal position, detecting, by the controller, a pedal tip-in or tip-out event, wherein the pedal tip-in event comprises a transition from (a) a shaft of the automatic transmission driving a shaft of the torque generating system to (b) the torque generating system shaft driving the automatic transmission shaft, and wherein the pedal tip-out event comprises an opposite transition than the pedal tip-in event; and
in response to detecting the pedal tip-in or tip-out event:
(i) determining, by the controller, a desired output torque for the torque generating system corresponding to the pedal tip-in or tip-out event, and
(ii) commanding, by the controller, the torque generating system to gradually transition, over a period, from its current output torque to the desired output torque to mitigate clunk caused by abrupt contact between gear teeth of the torque generating system shaft and the automatic transmission shaft.

12. The method of claim 11, wherein the torque generating system comprises an engine having a variable valve control (VVC) system configured to control at least one of a lift of and an actuation of an intake valve of the engine, and wherein commanding the torque generating system comprises commanding the VVC system to gradually transition the engine from its current output torque to the desired output torque.

13. The method of claim 12, wherein commanding the VVC system comprises:
initially setting the lift of the intake valve at a first lift that is different than a desired second lift corresponding to the desired output torque; and
by the end of the period, setting the lift of the intake valve at the desired second lift.

14. The method of claim 13, wherein:
for the tip-in event, the first lift is less than the desired second lift; and
for the tip-out event, the first lift is greater than the desired second lift.

15. The method of claim 11, wherein the torque generating system comprises an engine having a plurality of cylinders and a plurality of respective fuel injectors, and wherein commanding the engine comprises performing individual cylinder open-loop fuel control.

16. The method of claim 15, wherein performing individual cylinder open-loop fuel control by commanding, by the controller, each fuel injector to inject an amount of fuel according to a predetermined fuel supply curve over the period.

17. The method of claim 16, wherein each predetermined fuel supply curve is optimized based on test data to prevent lean/rich spikes for its respective cylinder that further exacerbate clunk.

18. The method of claim 17, wherein injection of the amount of fuel according to the predetermined fuel supply curves decreases exhaust gas temperature compared to closed-loop fuel control to mitigate or eliminate damage to a catalytic converter.

19. The method of claim 11, wherein the torque generating system comprises an electric motor, and wherein controlling the electric motor comprises controlling a power supplied to the electric motor.

20. The method of claim 11, further comprising detecting, by the controller, that the automatic transmission is in one of its higher gears as a pre-condition to commanding the torque generating system to gradually transition, over the period, from its current output torque to the desired output torque.

* * * * *